Patented July 10, 1951

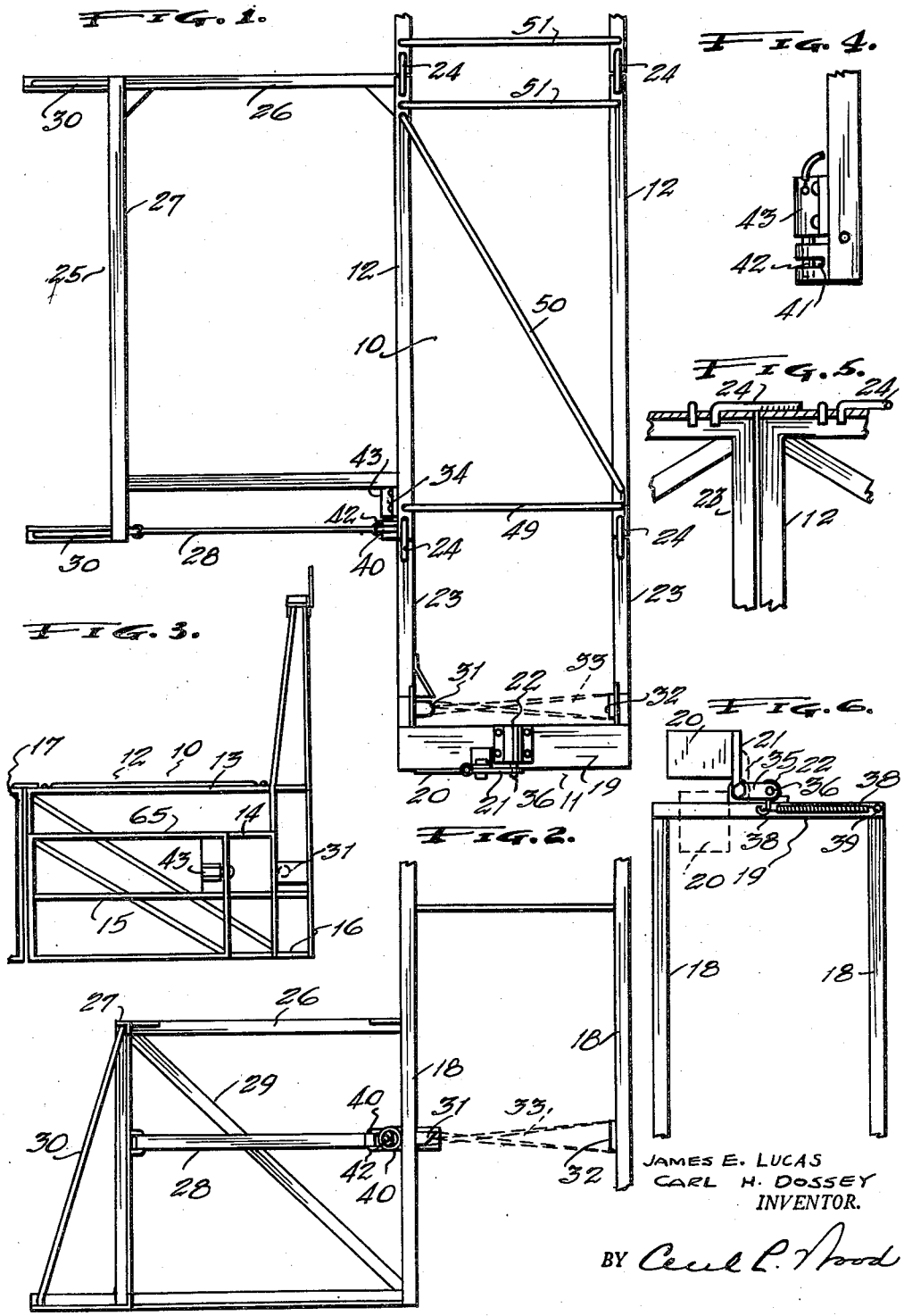

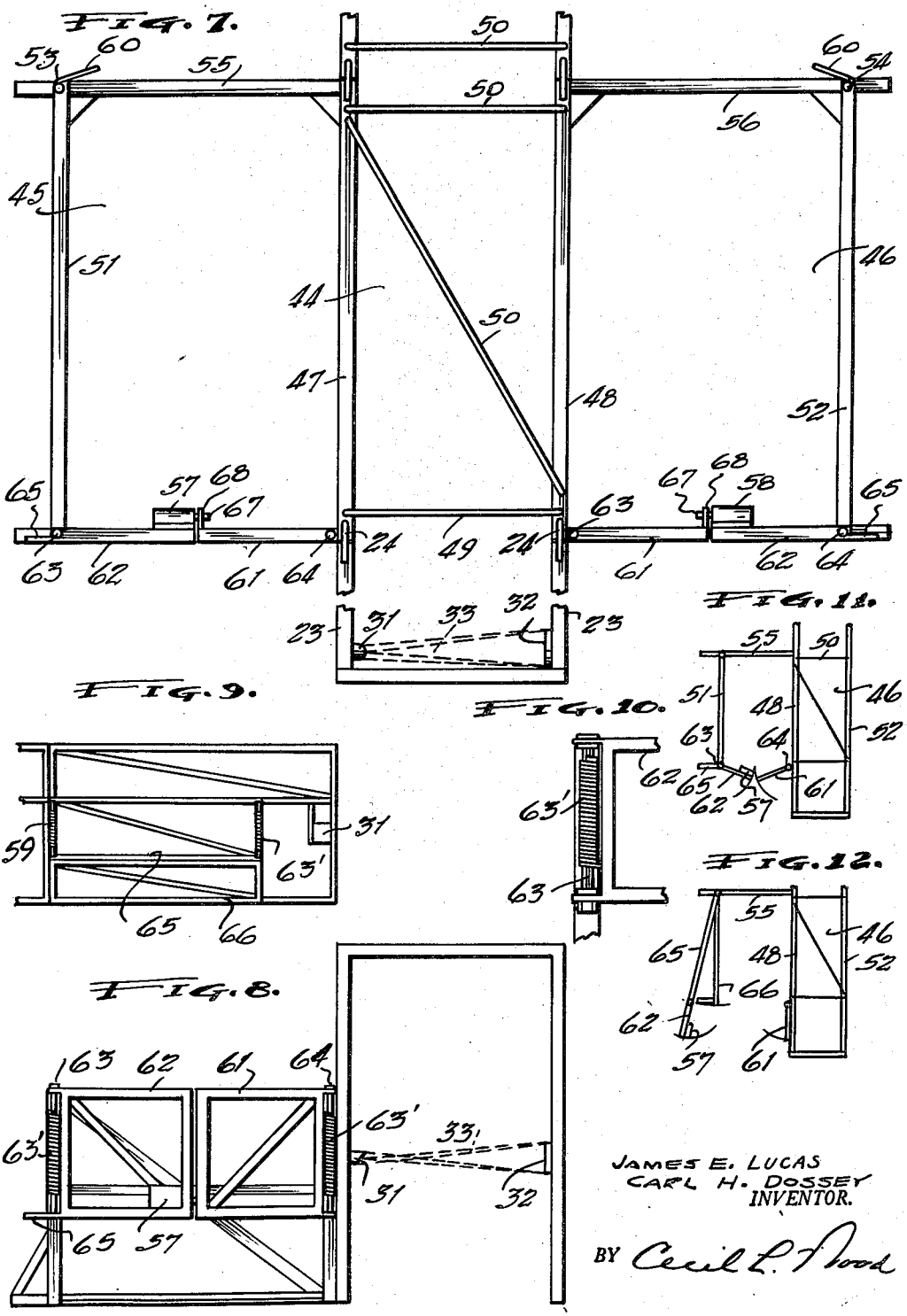

2,560,116

UNITED STATES PATENT OFFICE 2,560,116

STARTING DEVICE FOR RODEO CONTESTANTS

James E. Lucas, Fort Worth, Tex., and Carl H. Dossey, Chandler, Ariz.

Application December 16, 1948, Serial No. 65,585

3 Claims. (Cl. 119—15.5)

This invention relates to livestock handling equipment for rodeos, and the like, in which both men and animals participate, and it has particular reference to apparatus for directing the animals to an arena and timing the same with respect to mounted human contestants, as in calf roping and bulldogging contests, and its principal object resides in the provision of a collapsible chute or lane through which animals such as calves, or yearling steers, can be directed to an arena in which the contestants, on horse back, rope and tie the calves or bulldog the steers, the latter operation consisting of the horsemen leaping from the saddle and grasping the horns of the running steer and wrestling the same to the ground.

A further object of the invention resides in the provision of a time signalling device which is adapted to operate as the animal emerges from the chute or lane and may possess the embodiment of a flag, a light signal, or the like, indicating the instant when the horseman is privileged to move into action in pursuit of the animal as the latter is discharged from the chute and to perform thereon whatever operations are embraced by the rules of the contest.

A still further object of the invention resides in the provision of a detention pen for horse and rider arranged adjacent to the chute, or discharge lane, and having a flexible detachable barrier arranged thereacross which is capable of being detached, permitting the mounted contestant to leave the detention pen at the moment the signal is shown, and which is actuated by the animal passing through the outlet of the chute, it being customary to allow a certain handicap to the animal participant in the contest in passing through the chute.

It is a further object of the invention to provide apparatus which comprises, in addition to the chute through which the animal is admitted to the arena, a plurality of detention pens for mounted contestants, which may be arranged on each side of the discharge chute, each provided with a flexible, or detachable barrier, each of said barriers being capable of detachability at the instant the rodeo animal passes out of the chute and the visible or audible signal is actuated, thus properly timing the contestants comprising the rodeo animal and the mounted contestant in such a manner that the rodeo animal is given the required handicap and the mounted contestant may be in pursuit of the animal at the moment established by the particular rules of the contest.

Broadly, the invention contemplates the provision of an arrangement of elements by which rodeo contests can be conducted in accordance with all of the rules established for such purposes and by which the human agency, with respects to the timing of the activities of the rodeo animal and the human contestant, can be completely eliminated and the device be made entirely automatic.

While the foregoing objects are paramount, other and lesser objects will become manifest as the description proceeds, taken in connection with the appended drawings wherein:

Figure 1 is a plan view of a collapsible type of chute or lane through which the rodeo animal is directed into the arena, and the mounted contestant is detained behind the detachable barrier, and also illustrating the photo-electric cell by which the device is actuated.

Figure 2 fragmentarily illustrates a front elevational view of the assembly showing the photo-electric cell in the front of the discharge chute and the detachable barrier on the detention pen for the mounted contestant.

Figure 3 is a side elevational view of the assembly illustrating the collapsible frame work thereof.

Figure 4 is a detail view of one of the solenoid latching devices by which the detachable barrier is secured and automatically released.

Figure 5 is a fragmentary view of the frame work of the invention, shown in partial cross-section, illustrating the manner in which the same is assembled for collapsibility.

Figure 6 fragmentarily illustrates the upper transverse member across the front of the discharge chute and shows one form of the visual signaling device which is actuated by an electric current, showing its actuated position in dotted lines.

Figure 7 is a plan view of a modified form of the invention, in which the discharge chute is flanked on either side by a detention pen for a mounted contestant, and showing the detachable barriers retained by solenoid locking devices.

Figure 8 is a front end elevational view of the assembly illustrating the spring actuated barriers or gates on one of the detention pens, and the photo-electric cell arranged to direct the beam across the front of the discharge chute.

Figure 9 is a fragmentary side elevational view of the invention.

Figure 10 is a detailed view of one of the springs actuating the barriers on the detention pen, the barriers being shown fragmentarily.

Figure 11 is a schematic illustration of the invention showing the manner in which the same is actuated, and Figure 12 is a schematic illustration of the invention shown after the same has been operated to release the mounted contestant from the detention pen.

In the popular western type of entertainment generally called a rodeo there are certain contests conventionally referred to as "calf roping" and "bulldogging." The first involves the alacrity and expertness of a human contestant, mounted on a horse, employing or manipulating a lariat about the neck of a calf, stopping the calf with the aid of the horse, dismounting and throwing the calf to the ground, and tying at least three of the animal's legs in the shortest period of time. The second of the contests comprises the pursuit of a full grown steer discharged from a chute into an arena, dismounting from the horse or leaping to the horns of the steer and wrestling the same to the ground in the shortest period of time. In this contest the principal contestant is usually accompanied by another rider on horseback to perform certain operations with regard to the contest, such as directing the steer toward the contestant, and to prevent injury to the contestant.

The invention contemplates the provision of an arrangement for meeting the requirements of both types of contests and consists primarily of a chute or lane 10 which has a discharge end 11 and is connected at its opposite end to a corral (not shown) in which the bovine contestants are detained. The corral end of the chute 10 may be provided with a gate, or other type of closure, as desired.

The chute 10 is comprised of a pair of spaced frame members 12 which consist, as in Figure 3, of a plurality of longitudinal bars 13, 14, 15 and 16. The rear of the chute 10 consists of a pair of vertical standards 17 while the forward end of the chute has a vertical frame assembly 18 which extends well above the uppermost bar 13 and has a transverse member 19 across the top on which is supported a flag or signal 20 operated on an arm 21 which is secured to a pivot 22 preferably intermediate the end of the cross-member 19.

The chute 10 is provided with an extension which consists of auxiliary side members 23 capable of being connected to the side members 12 through the medium of links 24 in the manner illustrated in Figures 1 and 5. A detention pen 25 is provided which is arranged on one or both sides of the chute 10 in the manner shown in Figure 1 or 7, as desired, and in accordance with the contest in which the device is to be employed. The detention pen 25 comprises rear and side members 26 and 27 having a flexible barrier 28 arranged across the forward end in the manner shown in Figures 1 and 2. Suitable bracing members 29 and 30, by which the assembly is supported in upright position, are arranged on the frame structure which latter can be fabricated from angle steel or aluminum, as the occasion requires.

An electrical circuit is connected with the device and such circuit has a photo-electric cell 31 connected therein and is situated at the forward end of the chute 10, in the manner illustrated in Figure 1. A conventional type of refracting apparatus 32 is arranged opposite the cell 31 so that a beam 33 is projected across the chute 10 at all times in order that an animal passing therethrough will break the beam 33 and actuate the cell 31 to energize the circuit and consequently actuate the signal 20 arranged on top of the transverse member 19 at the forward end of the chute 10. Installed in the same circuit is a solenoid latch 34 for the flexible barrier 28 on the detention pen 25, and the member 34 is actuated at the time that the electrical circuit is energized by the breaking of the beam 33 of the photo-electric cell 31. As a result, an animal passing through the chute 10 and across the beam 33 of the photo-electric cell 31, will energize the electrical circuit to simultaneously actuate the signal 20 and release the barrier 28.

In rodeo contests critical signals are given by a flagman who observes a stop-watch in connection with the action or position of the rodeo animal passing through the chute. As the animal reaches the discharge end of the chute the flagman lowers the flag signal which is the signal to the mounted contestant to begin pursuit of the animal. It is also customary to allow the bovine contestant a certain handicap and this is usually accomplished by permitting the animal to cross a certain line before the signal is given for the mounted contestant to pursue the animal. In this arrangement the human agency is deeply involved and it is the purpose of the invention to provide an entirely automatic device by which the imperfections of human agency are completely eliminated as a factor in faulty timing which might prove costly to a contestant whose chances of winning a prize may hinge upon a fraction of a second. The signal, when manually given, is operated simultaneously with the animal crossing a fixed line, such as a tape or any other marker, but by the use of the invention the signal is automatically actuated at the time the bovine contestant crosses the beam projected by the photo-electric cell 31.

The automatic signal may consist of a flag or light, as desired. In Figures 1 and 6 a flag 20 is illustrated which has a standard 21 having a spindle 21' at its lower end pivoted in a bearing 22. An arm 35 is rigidly connected with the standard 21, as illustrated in Figure 6, and extends rearwardly from the flag 20 where the plunger pin 36 of a solenoid arranged in the bearing 22 is adapted to engage an aperture in the end of the arm 35 to lock the same in the upright position illustrated. A pull spring 37 is connected to the arm 35 by a hook 38 and secured by a pin 39, or other suitable means to the transverse member 19 above the chute whereby the signal or flag 20 is actuated, the plunger 36 retaining the same in its upright position.

The flexible barrier 28 across the forward end of the detention pen 25 is provided with a loop 40 in its securing end which is adapted to be arranged within a slot 41 and secured by the plunger 42 of a solenoid 43, illustrated in detail in Figure 4. The plunger 42 is adapted to pass through the loop 40 and retain the same until it is energized by the solenoid 43 which withdraws from the loop 40 to release the barrier 28 simultaneously with the action of the signal 20.

In the modified form of the invention, shown in Figures 7 to 12, inclusive, the chute 44 is especially designed for such contests as bulldogging and, while similar to the chute 12, has detention pens 45 and 46 attached to each side. The chute 44 has side members 47 and 48 and these are held upright by suitable bracing members 49 and 50 arranged transversely across the top of the chute 44, or diagonally thereacross, as in Figure 7. A photo-electric cell 31, with its reflector element 32, is arranged in the front of the chute and is capable of directing a beam 33 thereacross in the same manner as illustrated in Figures 1 and 2.

The outer side members 51 and 52 of the pens 45 and 46 are hinged at 53 and 54 at the rear thereof to vertical frame members 55 and 56 which are connected at right angles to the side members 51 and 52 of the chute 44. The members 51 and 52 are thus capable of swinging outwardly, as illustrated in Figure 12, when the latches 57 and 58 are released, aided by the springs 59 on each of the hinges 53 and 54. Suitable stops 50 are arranged on each of the members 51 and 52 at the hinges 53 and 54 whereby the extended positions of the side frames 51 and 52 are retained at proper angles with respect to the chute 44, as in Figure 12.

Each of the front barriers of the pens 45 and 46 consist of small gates 61 and 62, the latter being hinged to the side frame members 47 and 48 of the chute 44 at 63 and 64. Stops 65 are arranged on each outer gate 62 so that these members will extend in alignment with the side members 51 and 52 when these are expanded as in Figure 12. Springs 63 are arranged on each of the hinges 63 and 64 whereby to exert a tension on each of the gates 61 and 62 and automatically swing them outwardly to the positions illustrated schematically in Figure 12.

It will be noted, however, that only the upper sections 65 of the side members 51 and 52 are hinged to swing outwardly, as shown in Figures 9, 11 and 12, the lower sections 66 being fixed. It is only necessary to provide for freedom of operation of the mounted contestant in and about the stirrups of the saddle or the horse's feet, and to afford such freedom above the lower sections 66 of the detention pens would serve the required purpose.

With the aid of the springs 59 and 63, when the solenoid latches 57 and 58 are actuated, the gates 61 and 62 will open automatically and the side members 51 and 52 will extend at angles, in the manner shown in Figure 12, the gates 61 and 62 extending in alignment with the side members.

The solenoid latches 57 and 58 are provided with plungers 67 which function as bolts engageable with keepers 68 to retain the gates 61 and 62 closed, as in Figures 7 and 8, under tension of the springs 63, and as soon as the bolts are released the gates and side members swing open or outwardly permitting the mounted contestant to begin pursuit of the animal contestant.

It is an objection of the invention to afford a light and portable structure which is capable of being easily and expeditiously erected or dismantled and it is intended that the framing members be joined by any desirable means in keeping with the structure herein shown and described.

What is claimed is:

1. In a starting device for rodeo animals and performers, the combination comprising a chute having connection at one end with a corral and open at its discharge end, a detention pen arranged along one side of said chute having a flexible releasable barrier across its forward end and spaced back of the discharge end of said chute having electrical conductors for an electrical circuit on said chute, a photo-electric cell connected therein and arranged in the discharge end of said chute, the said cell being capable of directing a beam across said chute in the path of an animal traversing said chute, and an electrical latch for said barrier connected in said circuit capable of being actuated when said beam is broken.

2. In a starting device for rodeo animals, the combination comprising a chute for said animals having connection at one end with a corral and open at its discharge end, a detention pen arranged along one side of said chute and having a releasable barrier across its forward end and rearwardly of the discharge end of said chute, electrical conductors for an electrical circuit on said chute having a photo-electric cell connected therein and directing a beam across the forward end of said chute in the path of an animal traversing the same, and an electrical latch for said barrier actuated by said circuit when said beam is interrupted.

3. In a starting device for rodeo animals comprising, in combination with a demountable chute having a discharge end and a connection with a corral, a detention pen for horse and rider arranged at one side of said chute, a flexible releasable barrier for said pen spaced rearwardly of the discharge end of said chute, conductors for an electrical circuit arranged on said chute and pen having a signal connected therein, an automatic latch for said barrier connected into said circuit and adapted to function when said circuit is energized, and means in said circuit comprising a photo-electric cell for energizing same by an animal passing through said chute.

JAMES E. LUCAS.
CARL H. DOSSEY.

REFERENCES CITED

The following references are of record in the file of this patent:

UNITED STATES PATENTS

| Number | Name | Date |
| --- | --- | --- |
| 1,965,287 | Heintz | July 3, 1934 |
| 2,232,675 | Puett et al. | Feb. 18, 1941 |
| 2,276,500 | Maddox | Mar. 17, 1942 |